United States Patent
Bayyouk et al.

(10) Patent No.: US 12,480,392 B2
(45) Date of Patent: Nov. 25, 2025

(54) HYDRAULIC DRIVE TRAIN FOR A FRAC PUMP

(71) Applicant: SPM Oil & Gas Inc., Fort Worth, TX (US)

(72) Inventors: Jacob A. Bayyouk, Richardson, TX (US); Bryan C. Wagner, Aledo, TX (US); Wesley P. Clark, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 368 days.

(21) Appl. No.: 17/634,976

(22) PCT Filed: Jul. 28, 2020

(86) PCT No.: PCT/US2020/043913
§ 371 (c)(1),
(2) Date: Feb. 12, 2022

(87) PCT Pub. No.: WO2021/030048
PCT Pub. Date: Feb. 18, 2021

(65) Prior Publication Data
US 2022/0290545 A1 Sep. 15, 2022

Related U.S. Application Data

(60) Provisional application No. 62/886,263, filed on Aug. 13, 2019.

(51) Int. Cl.
| | |
|---|---|
| *E21B 43/26* | (2006.01) |
| *F04B 9/10* | (2006.01) |
| *F04B 11/00* | (2006.01) |
| *F04B 17/05* | (2006.01) |
| *F04B 23/06* | (2006.01) |
| *F04B 49/10* | (2006.01) |

(52) U.S. Cl.
CPC ............ *E21B 43/2607* (2020.05); *F04B 9/10* (2013.01); *F04B 11/0008* (2013.01);
(Continued)

(58) Field of Classification Search
CPC .... E21B 43/26; E21B 43/2607; E21B 43/267; F04B 9/10; F04B 17/05; F04B 23/06;
(Continued)

(56) References Cited

U.S. PATENT DOCUMENTS 2,766,701 A * 10/1956 Giraudeau .............. F04B 53/14
277/525
5,518,461 A * 5/1996 Pfordt ..................... F16H 47/04
475/72

(Continued)

FOREIGN PATENT DOCUMENTS

CN 205876701 U * 1/2017
WO WO-2010083991 A2 * 7/2010 .............. F04B 17/03
(Continued)

OTHER PUBLICATIONS

Search Report and Written Opinion of the ISA in PCT Application No. 2020043913, dated Oct. 13, 2020.
(Continued)

*Primary Examiner* — Alexander B Comley

(57) ABSTRACT

A hydraulic drive system is employed to transfer energy generated by a diesel engine to a frac pump. The hydraulic drive system includes a gearbox having a plurality of gears being coupled to and driven to produce rotational movement by the diesel engine, at least one hydraulic pump coupled to at least one gear of the gearbox, and operable to, driven by the rotational movement of the at least one gear of the gearbox, force a fluid at high pressure into at least one high-pressure fluid conduit, and at least one hydraulic motor coupled to the at least one high-pressure fluid conduit to receive the high-pressure fluid, and operable to transform energy in the high-pressure fluid to a rotational movement, which is used to power and drive a plurality of plungers in the frac pump.

16 Claims, 4 Drawing Sheets

(52) U.S. Cl.
CPC .............. *F04B 17/05* (2013.01); *F04B 23/06* (2013.01); *F04B 49/103* (2013.01)

(58) Field of Classification Search
CPC ...... F04B 49/103; F04B 11/0008–0033; E02F 9/2278–2296
USPC .................................................. 417/390, 16
See application file for complete search history.

(56) References Cited

U.S. PATENT DOCUMENTS

| | | | | |
|---|---|---|---|---|
| 6,568,919 | B1* | 5/2003 | Fletcher | F15B 1/26 417/307 |
| 8,968,573 | B2* | 3/2015 | Barnstrom | B66F 9/22 210/194 |
| 2015/0192117 | A1* | 7/2015 | Bridges | F04B 9/111 417/364 |
| 2017/0241448 | A1* | 8/2017 | Kondo | F16H 59/36 |
| 2017/0356586 | A1* | 12/2017 | Weinstein | F16L 55/055 |
| 2018/0266412 | A1* | 9/2018 | Stokkevåg | E21B 43/26 |

FOREIGN PATENT DOCUMENTS

| | | | | |
|---|---|---|---|---|
| WO | WO-2019025478 A1 * | 2/2019 | ............ | B21D 24/14 |
| WO | 2019113147 A1 | 6/2019 | | |

OTHER PUBLICATIONS

UK Examination Report for Int'l. Patent Appln. No. GB2201722.2, mailed Aug. 12, 2022 (4 pgs).

* cited by examiner

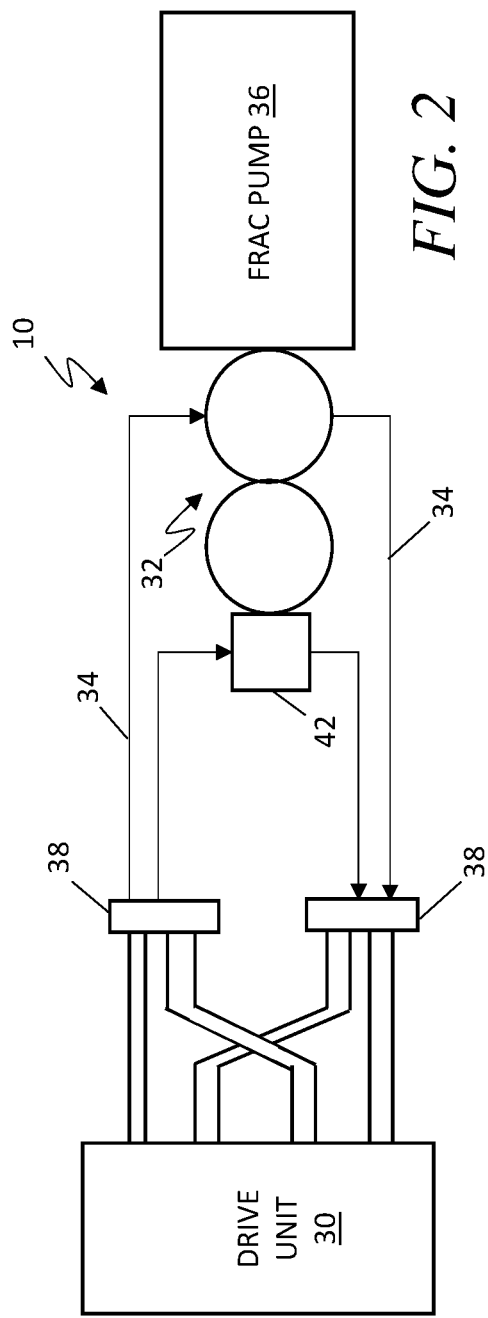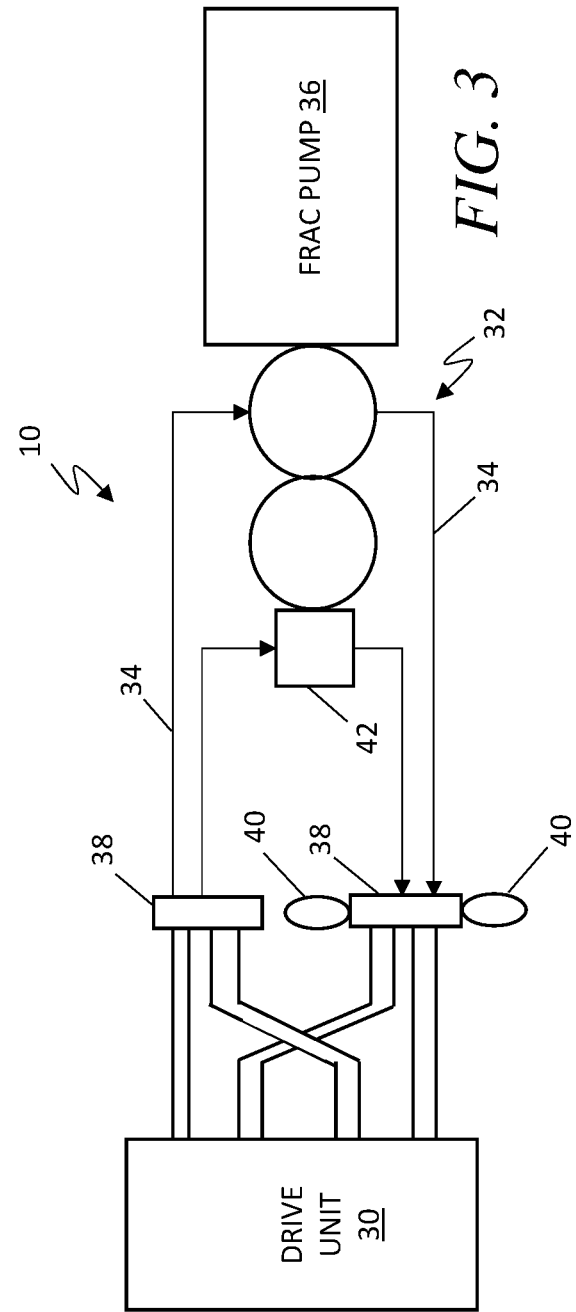

HYDRAULIC DRIVE TRAIN FOR A FRAC PUMP

CROSS-REFERENCE TO RELATED APPLICATION

This application is a national phase application of Patent Cooperation Treaty Application No. PCT/US2020/043913 filed Jul. 28, 2020, which claims priority to U.S. Provisional Application No. 62/886,263 filed Aug. 13, 2019, which is incorporated herein by reference in their entirety.

FIELD

The present disclosure relates to hydraulic fracturing pumps, and in particular, to a hydraulic drive train for a frac pump.

BACKGROUND

Hydraulic fracturing (a.k.a. fracking) is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps driven by a diesel engine and a transmission typically used in conventional setups.

BRIEF DESCRIPTION OF THE DRAWINGS

FIGS. 2-6 are additional block diagrams of exemplary embodiments of a hydraulic drive system for a frac pump according to the teachings of the present disclosure.

DETAILED DESCRIPTION

A typical fracking unit for hydrocarbon production is powered with a diesel engine driving a frac pump through a multispeed transmission and a gearbox. The frac pump is typically equipped with an integrated gearbox at the input shaft that steps down the speed (step up the torque) to provide the necessary crankshaft operating speed and the appropriate torque to the frac pump. The gearbox is coupled to the transmission and the diesel engine by a driveline. The transmission is often the most problematic component in the frac pump drive train. Due to its multiple gear ratios, some gears of the transmission will operate at or near their natural resonance frequencies. Because the transmission is located between the pulsating loads of the frac pump as well as the firing loads of the diesel engine, the transmission often experiences short lifespan due to the alternating loads occurring at resonance frequencies. As a result, the cost of transmission repair and replacement with the associated downtime are a significant issue for operators that face declining margins and increased competition from new equipment with lower operating costs.

There is a strong desire for a reliable frac pump drive system without a transmission. An exemplary drive train for the frac pump described herein includes a hydraulic drive system that eliminates the mechanical transmission and provides a fluid "coupling" between the prime mover (diesel engine) and the frac pump that would greatly reduce or eliminate many of the driveline resonance issues in conventional systems.

Figure 1:
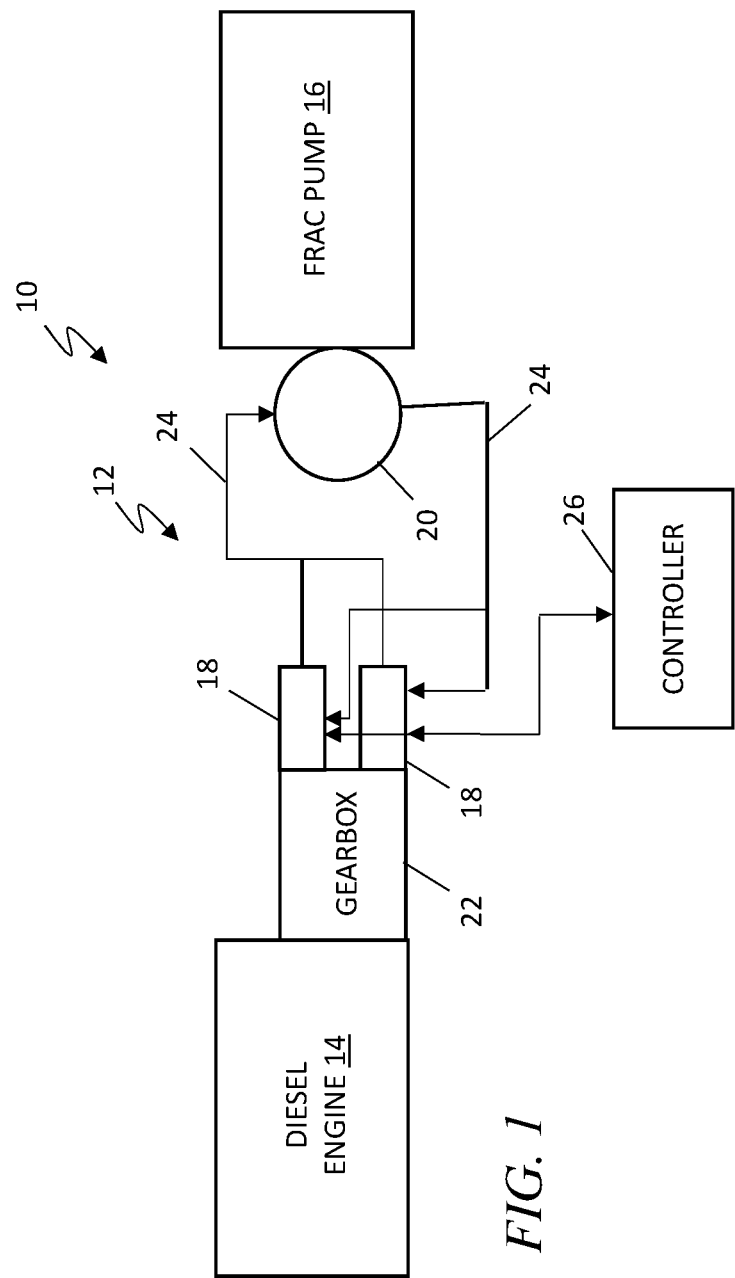
FIG. 1 is a block diagram of an exemplary embodiment of a hydraulic drive system for a frac pump according to the teachings of the present disclosure.

As shown in FIG. 1, the proposed exemplary frac pump drive train 10 replaces the transmission, driveline, and the frac pump gearbox with a closed-loop hydraulic system 12. The hydraulic system 12 is used to transmit power from a diesel engine 14 to the frac pump 16. The hydraulic drive train 10 includes one or more hydraulic pumps 18 and one or more hydraulic motors 20 that isolate the movement and vibrations of the engine 14 and frac pump 16. In particular as shown in FIG. 1, the diesel engine 14 drives a gearbox 22 preferably equipped with multiple hydraulic pump mount pads. One or more hydraulic pumps 18 are mounted on this gearbox 22 to provide fluid power to one or more hydraulic motors 20 to drive the frac pump 16. The hydraulic pumps 18 are coupled to the hydraulic motor(s) 20 via a number of fluid conduits 24 such as high-pressure hoses or steel pipes. The fluid conduits 24 conduct high-pressure fluid from the hydraulic pumps 18 to the hydraulic motors 20, and low-pressure fluids from the hydraulic motors 20 back to the hydraulic pumps 18. Therefore, this hydraulic drive train provides a fluid coupling that isolates the torsional activity of the prime mover (diesel engine) 14 from the torsional activity of the frac pump 16.

A controller 26 such as a proportional-integral-derivative (PID) controller may be used to control the speed of the hydraulic pumps 18 and motor 20. The controller 26 employs a control loop that receives feedback of the hydraulic pump speed to maintain the desired speed of the hydraulic drive system. The controller 26 automatically adjusts a control output based on the difference between a setpoint and a measured speed. Depending on the characteristics and dynamics of the hydraulic drive system, the parameters of the control system 26 can be tuned to ensure optimal operations. It should be noted that although diesel engines are typically used as the primary source of power to drive frac pumps, other forms of prime movers may be used. An example of the frac pump 16 is the SPM QEM 3000 continuous duty frac pump manufactured by The Weir Group PLC.

Referring to FIG. 2, a hydraulic drive unit 30 includes one or more hydraulic pumps driven by a diesel engine (other types of prime movers are also contemplated). As described above, the hydraulic pumps can be mounted on pads on a gearbox that is coupled to the diesel engine. The diesel engine drives the hydraulic pumps through the gearbox. Alternatively, hydraulic pumps, arranged in a "piggyback" configuration, can be mounted directly to the engine without a gearbox. The hydraulic pumps are coupled to one or more hydraulic motors 32 via high-pressure fluid conduits 34, such as pipes or hoses. The hydraulic motors 32 shown in FIG. 2 can be coupled in a piggyback configuration to the crank shaft of a frac pump 36. Alternately, the frac pump 36 may be driven from either end or from both ends. The high-pressure hoses 34 are gathered in manifolds 38 for distribution of high-pressure fluids to the hydraulic motor(s) 32. The hydraulic pumps force fluids at a high pressure to the hydraulic motors 32 coupled to the frac pump 36. The high-pressure fluid drives the hydraulic motors 32, which convert the hydraulic energy to mechanical energy and convey the mechanical energy to the frac pump 36. The mechanical energy is in the form of rotational energy in the hydraulic motor 32 is transformed into linear movement of the plungers in the frac pump 36. An alternate embodiment in shown in FIG. 3 employs two hydraulic fluid accumulators 40 coupled to a manifold 38. The accumulators 40 remove fluid vibration and maintain stable fluid pressure in the hydraulic conduits 34. The accumulators 40 may be optional depending on system configurations. Further, one or more control valves 42 may be used to selectively shut off fluid flow to a motor 32, so that it is activated only under certain operating conditions such as when there is lowered demand for torque.

Figure 4:
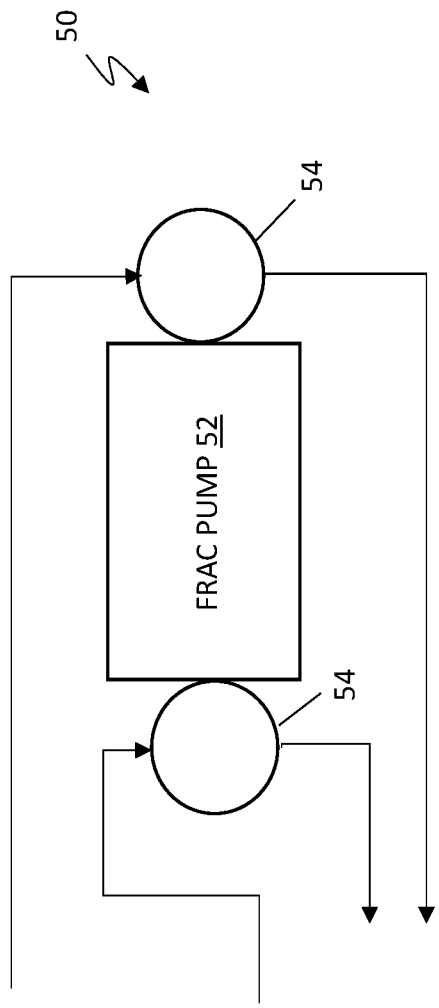
Figure 5:
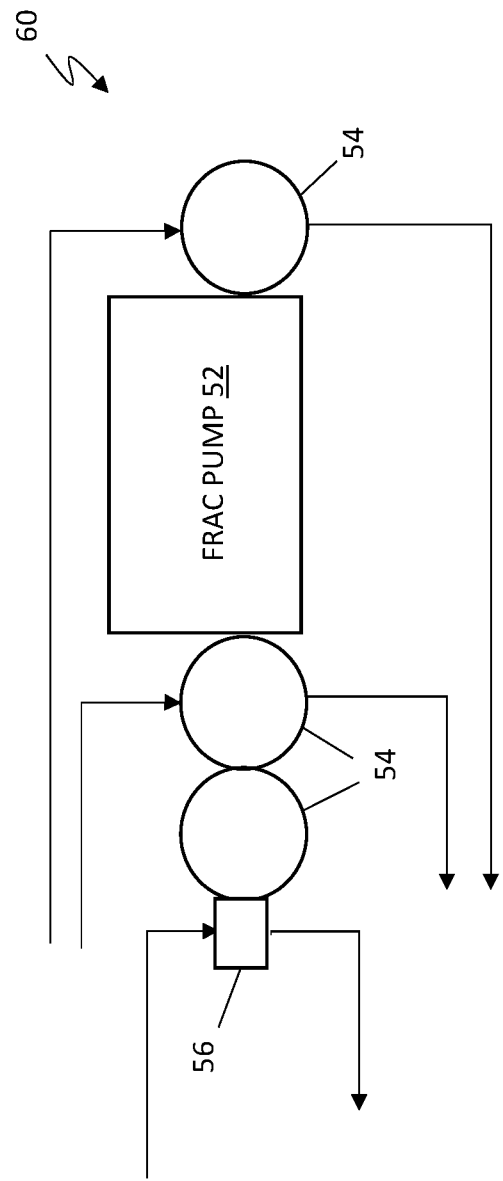
Figure 6:
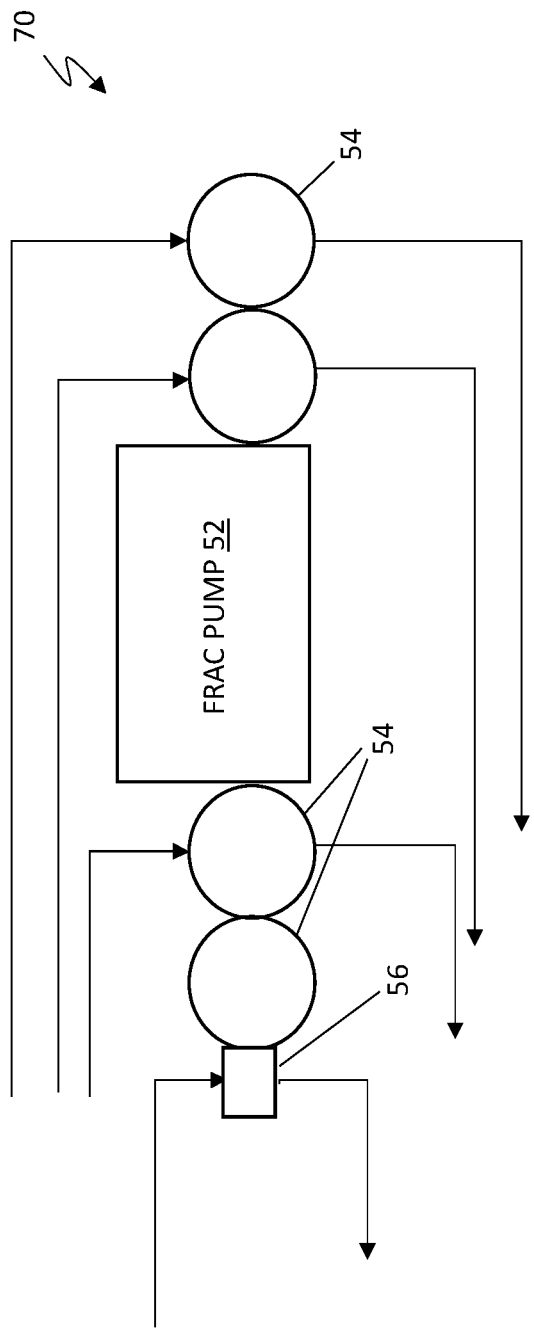

FIG. 4 is a simplified block diagram of another exemplary hydraulic drive system 50 with a hydraulic motor configuration where the frac pump 52 is driven from both ends. This embodiment includes hydraulic motors 54 coupled to each end of the frac pump 52, and one or more of the hydraulic motors 54 can be in a piggyback configuration, as shown in FIGS. 5 and 6. Fluid accumulators and valves 56 can also be employed in the fluid conduit to regulate fluid flow and pressure, and shut off flow to any hydraulic motor 54 that is deactivated as described above.

The hydraulic drive system may further include additional equipment not explicitly shown herein, such as a hydraulic reservoir, fluid regulators, additional valves, and other components. One or more valves may be used to regulate fluid flow to the hydraulic motors. A microcontroller-based system may be used to monitor fluid pressures, liquid levels, temperatures, and other system parameters to ensure optimal operations.

It should be noted that although not disclosed explicitly, a controller of the PID controller type described above may be employed in each of the embodiments shown in FIGS. 2-6. The PID controller is used to automatically adjust a control output for optimal operations based on the difference between a setpoint and a measured speed of the hydraulic motor(s). The PID controller may have a setpoint that is set in response to the frac pump output rate and the controller is configured to adjust the hydraulic pump speed to maintain the frac pump output rate.

The hydraulic-based drive system eliminates the transmission from the driveline of a frac pump, so that the entire system is more robust with decreased downtime. In this configuration, the diesel engine and the frac pump are generally isolated from one another, and energy from the diesel engine is transmitted to the frac pump by a closed-loop hydraulic drive system that serves to isolate the diesel engine from the frac pump. The components of the hydraulic drive system, the gearbox, hydraulic pump(s), and hydraulic motor(s) may be selected to optimize system operations and minimize loss.

The features of the present invention which are believed to be novel are set forth below with particularity in the appended claims. However, modifications, variations, and changes to the exemplary embodiments described above will be apparent to those skilled in the art, and the novel hydraulic drive train for a frac pump described herein thus encompasses such modifications, variations, and changes and are not limited to the specific embodiments described herein.

What is claimed is:

1. A hydraulic drive system transferring energy generated by a diesel engine to a frac pump, comprising:
    a gearbox comprising a plurality of gears being coupled to and driven by the diesel engine to produce rotational movement;
    at least one hydraulic pump coupled to at least one gear of the gearbox, and operable to, when driven by the rotational movement of the at least one gear of the gearbox, force a fluid at high pressure into at least one high-pressure fluid conduit;
    at least one hydraulic motor coupled to the at least one high-pressure fluid conduit to receive the high-pressure fluid, and operable to transform energy in the high-pressure fluid into a rotational movement, which is used to power and drive a plurality of plungers in the frac pump;
    at least one return fluid conduit operable to conduct low-pressure fluid from the at least one hydraulic motor back to the at least one hydraulic pump; and
    at least one hydraulic accumulator coupled to a manifold, wherein the at least one hydraulic accumulator is coupled, via the manifold, to the at least one return fluid conduit at a downstream end of the at least one hydraulic motor and configured to maintain stable fluid pressure in the at least one return fluid conduit, wherein the at least one hydraulic accumulator comprises two hydraulic accumulators coupled to the manifold.

2. The hydraulic drive system of claim 1, further comprising at least one valve in the at least one high-pressure fluid conduit adapted to regulate flow and pressure of the fluid therein.

3. The hydraulic drive system of claim 1, further comprising at least one valve in the at least one return fluid conduit, the at least one valve adapted to regulate flow and pressure of the fluid therein.

4. The hydraulic drive system of claim 1, wherein the at least one hydraulic pump comprises a plurality of hydraulic pumps coupled to the diesel engine in a piggyback configuration.

5. The hydraulic drive system of claim 1, further comprising a closed loop controller coupled to the at least one hydraulic pump configured to adjust at least one measured speed of the at least one hydraulic pump to bring a frac pump output rate closer to a target frac pump output rate.

6. The hydraulic drive system of claim 5, wherein the controller comprises a proportional-integral-derivative controller.

7. A hydraulic drive system transferring energy generated by a prime mover to a frac pump, comprising:
    a gearbox comprising a plurality of gears being coupled to and driven by the prime mover to produce rotational movement;
    at least one hydraulic pump coupled to at least one gear of the gearbox, and operable to, when driven by the rotational movement of the at least one gear of the gearbox, force a fluid at high pressure into at least one high-pressure fluid conduit;
    at least one hydraulic motor coupled to the at least one high-pressure fluid conduit to receive the high-pressure fluid, and operable to transform energy in the high-pressure fluid into a rotational movement, which is used to power and drive a plurality of plungers in the frac pump;
    at least one return fluid conduit operable to conduct fluid from the at least one hydraulic motor back to the at least one hydraulic pump;
    a manifold coupled to the at least one return fluid conduit at a downstream end of the at least one hydraulic motor;
    two hydraulic accumulators coupled to the manifold; and
    a controller coupled to the at least one hydraulic pump configured to receive at least one measured speed from the at least one hydraulic pump and generating a control signal to adjust the at least one measured speed of the at least one hydraulic pump to bring a frac pump output rate of the hydraulic drive system closer to a target frac pump output rate.

8. The hydraulic drive system of claim 7, further comprising at least one valve in the at least one high-pressure fluid conduit adapted to regulate flow and pressure of the fluid therein.

9. The hydraulic drive system of claim 7, further comprising at least one valve in the at least one return fluid conduit, the at least one valve adapted to regulate flow and pressure of the fluid therein.

10. The hydraulic drive system of claim 7, wherein the at least one hydraulic pump comprises a plurality of hydraulic pumps coupled to the prime mover in a piggyback configuration.

11. The hydraulic drive system of claim 7, wherein the at least one hydraulic motor comprises a plurality of hydraulic motors coupled to the frac pump in a piggyback configuration.

12. A hydraulic drive system transferring energy generated by a prime mover to a frac pump, comprising:
   at least one hydraulic pump coupled to the prime mover, and operable to, when driven by the prime mover, force a fluid at high pressure into at least one high-pressure fluid conduit;
   at least one hydraulic motor coupled to the at least one high-pressure fluid conduit to receive the high-pressure fluid, and operable to transform energy in the high-pressure fluid into a rotational movement, which is used to power and drive a plurality of plungers in the frac pump;
   at least one return fluid conduit operable to conduct fluid from the at least one hydraulic motor back to the at least one hydraulic pump;
   a manifold coupled to the at least one return fluid conduit at a downstream end of the at least one hydraulic motor; and
   two hydraulic accumulators coupled to the manifold.

13. The hydraulic drive system of claim 12, further comprising a controller coupled to the at least one hydraulic pump configured to receive at least one measured speed from the at least one hydraulic pump and generate a control signal to adjust the at least one measured speed of the at least one hydraulic pump to bring a frac pump output rate of the hydraulic drive system closer to a target frac pump output rate, wherein the controller comprises a proportional-integral-derivative controller.

14. The hydraulic drive system of claim 12, further comprising at least one valve in the at least one high-pressure fluid conduit adapted to regulate flow and pressure of the fluid therein.

15. The hydraulic drive system of claim 12, wherein the at least one hydraulic pump comprises a plurality of hydraulic pumps coupled to the prime mover in a piggyback configuration.

16. The hydraulic drive system of claim 12, wherein the at least one hydraulic motor comprises a plurality of hydraulic motors coupled to the frac pump in a piggyback configuration.

* * * * *